(12) United States Patent
Lamberts Van Assche (10) Patent No.: US 7,252,761 B2
(45) Date of Patent: Aug. 7, 2007

(54) FILTRATION INSTALLATION FOR FILTERING THE WATER OF A WATER POOL

(75) Inventor: Marc Lamberts Van Assche, Brussegem (BE)

(73) Assignee: Propulsion Systems, Brussels (BE)

( * ) Notice: Subject to any disclaimer, the term of this patent is extended or adjusted under 35 U.S.C. 154(b) by 217 days.

(21) Appl. No.: 10/516,456

(22) PCT Filed: Jun. 5, 2003

(86) PCT No.: PCT/BE03/00100

§ 371 (c)(1),
(2), (4) Date: Jul. 26, 2005

(87) PCT Pub. No.: WO03/104588

PCT Pub. Date: Dec. 18, 2003

(65) Prior Publication Data

US 2006/0021922 A1    Feb. 2, 2006

(30) Foreign Application Priority Data

Jun. 6, 2002 (EP) .................................. 02447112

(51) Int. Cl.
*E04H 4/12* (2006.01)
*B01D 24/46* (2006.01)
*B01D 24/14* (2006.01)

(52) U.S. Cl. ........................ 210/167.12; 210/167.13; 210/167.14; 210/269; 210/275

(58) Field of Classification Search ........... 210/167.01, 210/167.1, 167.12, 167.13, 167.14, 263, 210/269, 275, 279
See application file for complete search history.

(56) References Cited

U.S. PATENT DOCUMENTS 3,061,100 A * 10/1962 Fehlmann .................... 210/108

(Continued)

FOREIGN PATENT DOCUMENTS

EP    0 761 909    3/1997

(Continued)

*Primary Examiner*—Fred G. Prince
(74) *Attorney, Agent, or Firm*—Sughrue Mion, PLLC (57) ABSTRACT

A filtration installation for a swimming pool (2) comprising a filter vessel (4) containing a filter bed (5), an inlet pipe (6) extending between the pool and the filter vessel, a return pipe (8) extending between the filter vessel and the pool, a reversible pump (9) enabling to generate, in a backwashing state, an upward flow of water through the filter bed, and a drain pipe (11) arranged for removing the water pumped by the pump in its backwashing state through the filter bed. In order to reduce the required controls of the installation and to make it easier for unskilled persons to maintain it, the upper portion (12) of the filter vessel is in liquid communication through the inlet pipe (6) with the water in the pool and the inlet pipe is provided with a one-way valve (10). The reversible pump is disposed downstream this one-way valve so that the water pumped upwards through the filter bed in the back-washing state of the pump is automatically removed through the drain pipe whilst in the reversed filtering state of the pump water from the pool is filtered through the filter bed. The reversible pump (9) may comprise a propeller (14) which is situated within the pool to create a current or jet stream against which a swimmer can swim-in-place.

17 Claims, 9 Drawing Sheets

U.S. PATENT DOCUMENTS

| | | |
|---|---|---|
| 3,173,865 A | 3/1965 | Bosico |
| 3,616,468 A | 11/1971 | Takacs |
| 4,127,485 A * | 11/1978 | Baker et al. ........... 210/167.13 |
| 4,740,307 A | 4/1988 | Buelteman |
| 4,867,874 A * | 9/1989 | Aubert et al. .......... 210/167.13 |
| 4,997,558 A * | 3/1991 | Baker ......................... 210/143 |
| 5,785,846 A | 7/1998 | Barnes et al. |
| 6,143,186 A * | 11/2000 | Van Unen ................... 210/786 |
| 6,451,209 B1 * | 9/2002 | Kaas .......................... 210/650 |

FOREIGN PATENT DOCUMENTS

| | | | |
|---|---|---|---|
| JP | 10-118420 | * | 5/1998 |

* cited by examiner

FILTRATION INSTALLATION FOR FILTERING THE WATER OF A WATER POOL

The present invention relates to a filtration installation for filtering water of a water pool, in particular of a swimming pool, arranged to be filled with water up to a predetermined water level, which installation comprises a filter vessel separate from the water pool and containing a filter bed, the filter vessel being arranged to be installed next to the pool with its filter bed situated at least partially underneath said predetermined water level, with at least one inlet pipe extending between the pool and an upper portion of the filter vessel for conducting water from the pool to the filter vessel and with at least one return pipe extending between a lower portion of the filter vessel and the pool for conducting filtered water having passed through the filter bed to the pool, the installation further comprising a reversible pump enabling to generate, in a backwashing state, an upward flow of water through the filter bed, and at least one drain pipe arranged for removing the water pumped by the pump in its backwashing state through the filter bed into the upper portion of the filter vessel.

Such an installation is already disclosed in GB-A-2 234 168. The disclosed installation is especially intended to be used for filtering the water of quite large public pools. In order to reduce the energy requirements of the filtration installation a low pressure propeller or turbine pump is used to pump the water on top of an open topped filter bed which is arranged with its top level with the water in the pool. The water level above the filter bed is raised by means of the pump to a value needed to achieve a gravitational flow of water through the filter. Underneath the filter bed, in the return pipe to the pool, a reversible propeller pump is provided to enable a backwashing of the filter bed. In its reversed state, this pump can also be used to assist the flow of water through the filter under normal filtration conditions.

A drawback of the disclosed filtration installation is that two pumps are required to assure the filtration and the backwashing functions. Moreover, control devices are required to ensure for example that the water does not rise too high in the filter vessel when water is pumped therein under normal filtration conditions. The operation of the installation for backwashing the filter is further also quite complex. As a result of these drawbacks, the installation may be suitable for large public swimming pools operated by specialised maintenance personnel but not for smaller domestic swimming pools. The installation is indeed not only quite expensive due to the required controls of pumps and valves, but manipulation of the pumps and valves for maintenance, cleaning the pool and backwashing the filter will often be found too difficult for a private pool owner.

A first object of the present invention is therefore to provide a filtration installation which requires less controls and which is easier to maintain by unskilled persons.

Another drawback of the known swimming pool filtration systems is that installing them requires typically assembling the different components, connecting filter pump and filter with piping to the pool. More and more extra devices for heating, automatic desinfection, automatic backwashing and cleaning are added to the installation. This requires more piping, valves and couplings. For adding the capability of automatic backwashing to a filtersystem, valve(s) have to be motorised and extra controls are necessary. All of this is relatively expensive, but even more important are the risks of damage to the installation and pool when there is a malfunction of one of the components. That is why pool builders do not recommend it and only very few filter installations today have an automatic backwashing system. Typically every filter-installation is in a different location and thus has to be mounted on site and has to be adapted to its location. For example extra valves need to be installed when the filter is placed below the pool water level, bigger pipes and/or stronger pumps are needed when the distance between filter and pool is longer, etc. Therefore, installation of a swimming pool filtration system requires specialised installers and a lot of time and money. For the pool owner manipulating the valves and controlling the equipment needed for maintenance, cleaning the pool and backwashing the filter is often found too difficult.

In trying to improve on this scheme, manufacturers have come up semi-solutions with little rooms with the filter system pre-installed. These rooms are mostly intended to be imbedded in the ground, since they are not aesthetically pleasing. Still they have lots of valves and piping and in addition it is more difficult to service. The biggest problem however comes from groundwater, rain or pool water coming into the room and damaging the pump and the other electrical equipment. A second object of the present invention is thus to provide a filtration installation which can be embedded into the ground without requiring the construction of a water-tight room in the ground.

In order to achieve the first object of providing a filtration installation which requires less controls and which is easier to maintain by unskilled persons, the installation according to the invention is characterised in that the upper portion of the filter vessel is in liquid communication through said inlet pipe with the water in the pool so that water from the pool can flow by gravity through the inlet pipe into the filter vessel, the inlet pipe is provided with a one-way valve arranged to prevent a flow of water from the upper portion of the filter vessel into the pool, the drain pipe is arranged upstream the filter bed but downstream the one-way valve, and said reversible pump is disposed downstream the drain pipe so that the water pumped upwards through the filter bed in the backwashing state of the pump is removed through the drain pipe whilst in the reversed filtering state of the pump, water is pumped out of the pool to generate a flow of water from the pool through the inlet pipe, the filter bed and the return pipe back to the pool.

In the installation according to the invention, the pump used for pumping water through the filter under the normal filtration conditions can also be used to backwash the filter without having to provide additional piping, valves and control devices to switch these valves to change the direction of the water through the filter. For backwashing the filter, only the rotation direction of the pump has to be reversed so that an upward instead of a downward flow of water is generated through the filter bed. Due to the presence of the one-way valve the inlet pipe is automatically closed off by the pressure of the rising water, i.e. without requiring any additional controls, and the water flowing upwards through the filter bed can simply be discarded via the drain pipe. Backwashing the filter is thus easy to carry out, even by unskilled persons.

U.S. Pat. No. 3,616,468 discloses a filtration installation with a reversible pump which enables to backwash the filter by reversing the rotation of the pump. The filter vessel is a vessel which is concentric to the circular pool. Since the inner wall of the filter vessel is formed by the wall of the pool, or is in other words common to the pool and the filter vessel, the filter vessel is not separate or independent from the pool. A drawback of such a filtration installation is that its construction is expensive, especially when the pool wall should be made of solid materials like concrete. Moreover, the filtration installation does not allow water from the bottom of the pool being drawn into the filter. To enable to clean the bottom, the water returned to the pool is returned through a rotary tube on the bottom of the pool, which tube is designed to stir up the dirt. Such a system works however only for very small particles. Any substantial dirt will be too heavy to go upwards to the top of the pool to be drawn into the filter. Consequently, a vacuum cleaning unit is still necessary. However, the filtration installation does not allow any connection with the tube of a vacuum cleaner. Moreover, the cleaning system with a rotary tube requires a circular pool with a flat bottom. The rotary tube on the bottom of the pool is also not aesthetically pleasing and is a possible danger for swimming people.

In order to achieve the second object of providing a filtration installation which can be embedded into the ground without requiring the construction of a water-tight room in the ground, the installation according to a preferred embodiment of the invention, does not only show the above described characteristics so that no motorised valves are necessary but said reversible pump is moreover a submergible pump.

The required pump can thus be mounted simply within the space of the filtration installation through which the water flows.

In a preferred embodiment of the installation according to the invention, the filtration installation comprises a removable shut-off element provided with a fitting for connecting a suction tube for a vacuum cleaning unit, the shut-off element being arranged to stop, upstream the reversible pump, in the filtering state of the pump, at least partially said flow of water from the pool through the inlet pipe to enable to create a reduced pressure downstream the shut-off element, the shut-off element being arranged to be applied either upstream or downstream the drain pipe, when the shut-off element is arranged to stop the flow of water upstream the drain pipe, the drain pipe is provided with a further one-way valve to enable to create said reduced pressure downstream the shut-off element.

An important advantage of this preferred embodiment is that it is possible to connect a vacuum cleaning unit to the filtration installation so that the dirt on the bottom of the pool can be sucked up and removed by means of the filtration installation. In other words, the vacuum cleaning unit itself does not have to contain any pump or filtering means.

In an advantageous embodiment of the installation according to the invention, the reversible pump comprises a propeller or an archimedes' screw for generating the flow of water through the filter bed.

An advantage of this embodiment Is that the operation of such propeller or archimedes' screw type of pump requires less energy since they are highly efficient in pumping large quantities of water although they have only a limited performance in total head. Due to the high flow rates, an excellent backwashing can be achieved as a result of the thorough fluidisation of the filter material in the filter bed.

Preferably, the reversible pump comprises a propeller which is situated at the outlet of the return pipe for generating the flow of water through the filter bed, a by-pass being provided for supplying additional water directly from the pool to the pump to be able to create a current in the pool, in particular a so-called jetstream, against which a swimmer can swim-in-place in the pool.

The combination of filter and jetstream in this preferred embodiment is very interesting since both functions can be obtained at a substantially lower cost than with the filtering and jetstream devices installed separately.

Other particularities and advantages of the invention will become apparent from the following description of some particular embodiments of the filtration installation according to the present invention. The reference numerals used in this description relate to the annexed drawings wherein:

Figure 1:
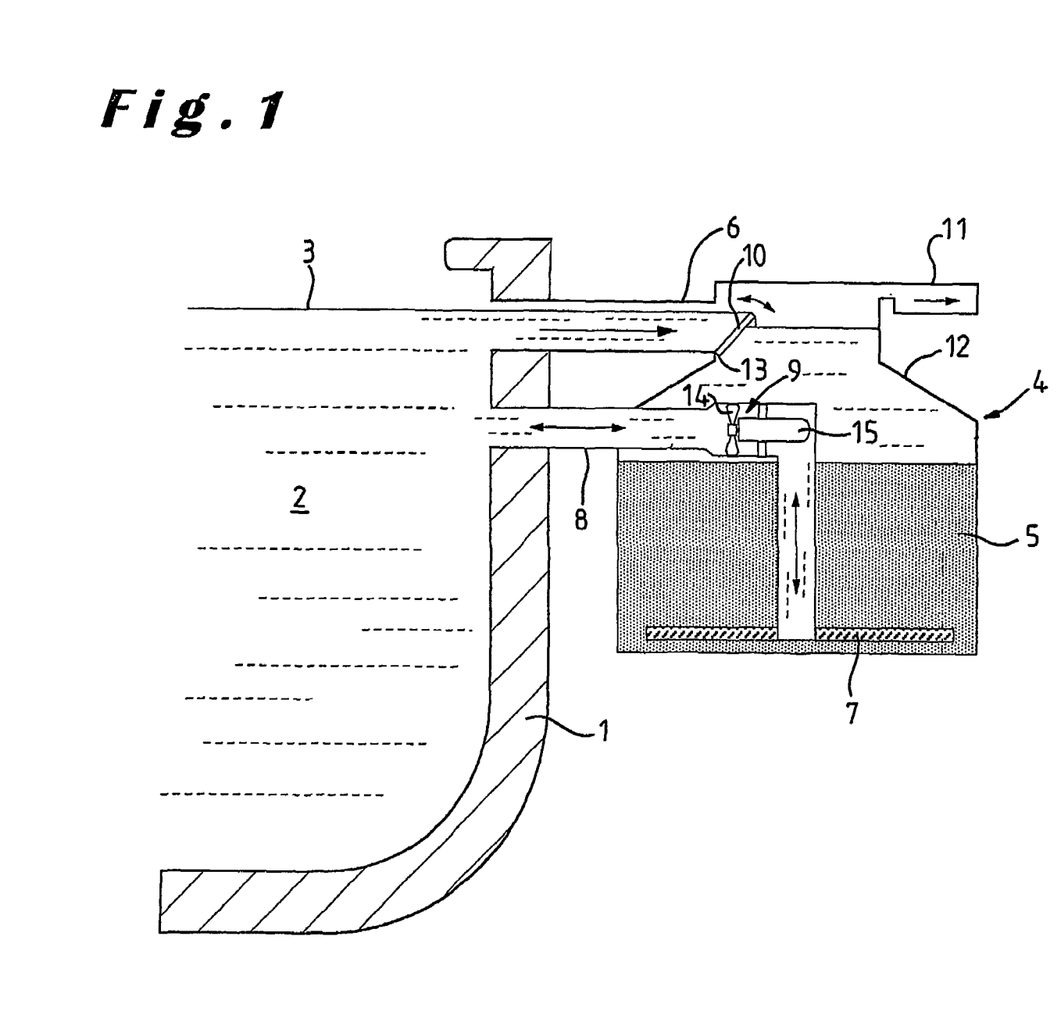
FIG. 1 is a schematic sectional view of a water pool and a filtration installation according to the invention for filtering the water of this water pool.

The filtration installation illustrated in FIG. 1 is located entirely underneath the earth surface close to a wall 1 of a swimming pool 2 which is filled with water up to a predetermined or normal water level 3. Instead of a swimming pool, the pool or tank may also contain waste water, potable water or any other water which needs to be filtered.

The filtration installation comprises a filter vessel 4 which is entirely separate from the pool 2, i.e. which has no walls in common and can thus be installed as a unit independent from the pool. For filtering the water, the filter vessel contains a filter bed 5 composed of a filter medium such a sand, diatomeus earth, etc. The top of the filter bed is situated underneath the normal water level 3 of the pool 2. For supplying water from the pool to the filter bed 5 the upper portion 12 of the filter vessel 4 is connected by means of an inlet pipe 6 to the pool 2. The water percolating through the filter bed 5 is collected in the bottom portion of the filter bed 5 by collectors 7, for example by perforated tubes, and is guided by a return pipe 8 back to the swimming pool 2. Instead of collectors, it is also possible to provide for example a sieve underneath the filter medium withholding the filter medium but allowing the water to pass.

The inlet pipe 6 is located at least with its bottom over its entire length underneath the normal water level 3 in the pool 2 so that the upper portion of the filter vessel 4 is in liquid communication with the water in the pool 2. This means that water can flow by gravity from the pool to the filter vessel. When no pumping is carried out, the water in the upper portion of the filter vessel 4 is at the same level as the water in the pool 2. In case the filter vessel is a hermetically closed vessel, it could be arranged entirely underneath the water level. In that case, the water level in the filter vessel will be of course lower than the water level in the pool.

In order to be able to generate a downward flow of water through the filter bed 5 in order to filter the water, the installation according to the invention comprises a pump 9 which is located in the embodiment illustrated in FIG. 1 downstream the filter bed 5, more particularly within the return pipe 8 to the pool 2. In the present specification, the terms upstream and downstream have to be considered in the flow direction of the water during the normal filtering state of the installation. The pump 9 is a reversible pump 9 which can be operated in a filtering state, wherein it generates a downward flow of water through the filter bed 5, and in a reversed or backwashing state wherein it generates an upward flow of water through the filter bed 5 in order to fluidise and wash the filter medium.

In order to prevent the dirty water pumped upwards through the filter bed into the upper portion of the filter vessel 4 during the backwashing operation from flowing back to the pool, a one-way valve 10 is provided at the outlet of the inlet pipe 6 in the upper portion of the filter vessel 4. Under the pressure of the rising water, this one-way valve 10 is automatically closed. For removing the back wash water, a drain pipe 11 is connected to the upper portion 12 of the filter vessel 4. This drain pipe 11 has preferably a portion which is situated at the maximum water level of the water pool 2 so that the drain pipe provides an overflow for the pool 2. In the illustrated embodiment, the inlet of the drain pipe 11 is situated at this maximum water level but it is also possible to arrange another portion of the drain pipe at this maximum level. When the water level in the pool rises above this maximum level, for example because it was filled above the normal predetermined level and a number of persons enter the water, the excess of water will flow away through the drain pipe 11.

In the embodiment illustrated in FIG. 1 the one-way valve 10 is not only used to close off the inlet pipe 6 during the backwashing operation but has also a skimming function. The top surface of the portion of the inlet pipe 6 between the pool and the one-way valve 10 is indeed situated over the entire length of this portion above the normal water level 3 of the pool so that the water in the inlet pipe between the pool and the one-way valve is at the same level as in the pool. In this way, any dirt floating on the water can float through the inlet pipe to the one-way valve 10. This one-way valve 10 comprises an upright flap which has a specific weight smaller than the specific weight of water and which is hinged about a hinge 13 fixed to its bottom edge to form a skimmer weir.

The pump 9 illustrated in FIG. 1 is a submergible pump comprising a propeller 14 and an electric pump motor 15 which is also submerged in the water. Due to the fact that this motor 15 has not to be insulated from water and due to the fact that the only flow control valve 10 is only operated by the pressure of the water no water-tight underground room has to be constructed for these elements and there is no risk of damaging these elements by water penetrating in such a room. A further advantage of a submergible pump is that the energy losses are recuperated since the heat of the motor is entirely absorbed by the pool water.

Instead of being provided with a propeller 14, the pump motor 15 could also be provided with an archimedes' screw. Both a propeller and an archimedes' screw offer the advantage of requiring less energy than the usual filter pumps of the impeller type. The fact that a propeller or archimedes' screw does not enable to provide a large water pressure is not a problem in the filtration installation according to the present invention since, due to the simplicity of the installation and the fact that no water-tight room has to be provided, the installation can be arranged closer to the water pool and thicker pipes can be used resulting in less friction losses in the piping. Compared to conventional pool filtration systems, the total energy expenses of the filtration system may thus be up to 70% less.

Figure 2:
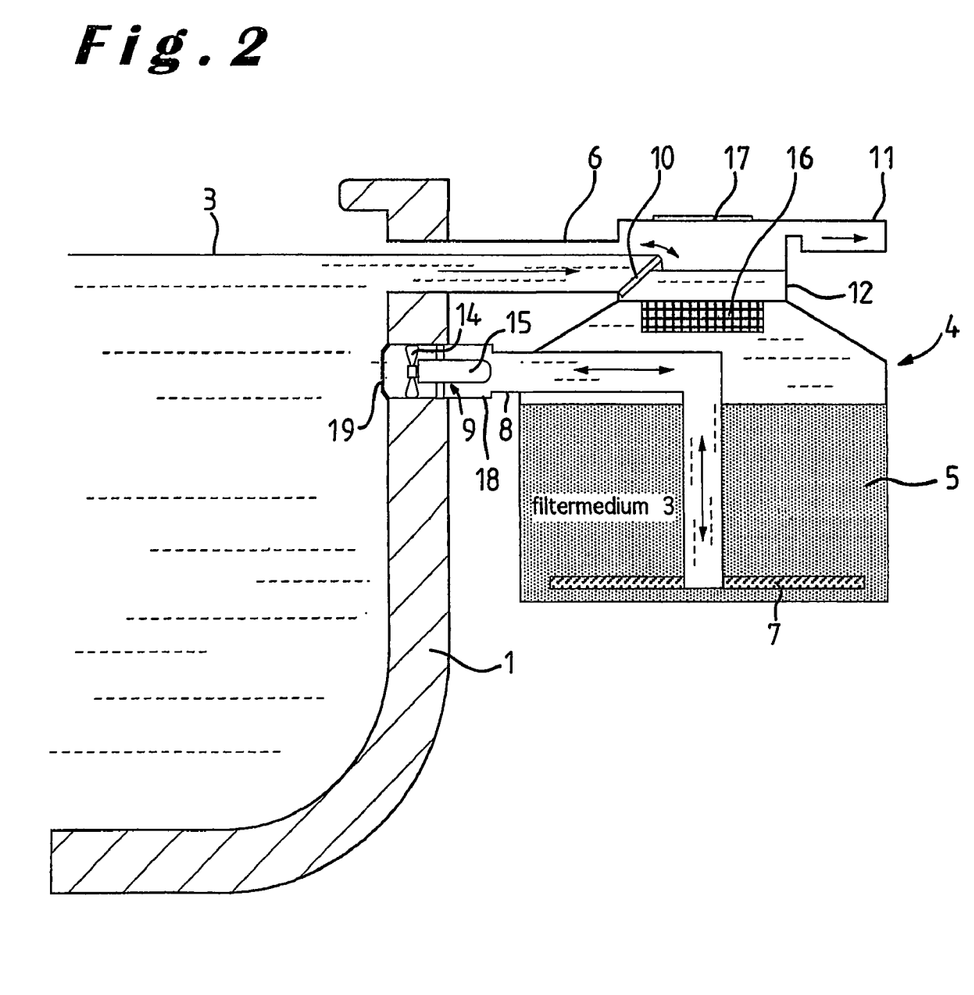
FIGS. 2 to 9 are views similar to the view of FIG. 1 but illustrating alternative embodiments of the filtration installation according to the invention.

The filtration installation illustrated in FIG. 2 differs from the previous installation in that the filter pump 9 is arranged closer to the pool wall 1, in that a pre-filter basket 16 is provided in the upper portion of the filter vessel 4 and in that the upper portion 12 of the filter vessel 4 is hermetically closed by means of a cover 17.

Due to the hermetic closure of the upper portion 12 of the filter vessel 4 a pressure can be build up therein when back washing the filter medium so that the drain pipe 11 may be longer or of a smaller section or may even rise up to a level higher than the maximum level of the pool water.

The pre-filter basket 16 will prevent larger dirt particles from clogging the filter medium 5. By opening the cover 17, the pre-filter basket 16 can be removed and cleaned. In the same way as described hereinafter with reference to FIGS. 7 and 9, the filtration installation preferably comprises a shut-off element 33 which can be arranged on top of the pre-filter basket 16 to stop the flow of water. The shut-off element is provided with a fitting 34 for connecting the tube 35 of a pool cleaning unit 36 by means of which dirt can be sucked out of the pool.

The advantage of arranging the filter pump 9 closer to the pool wall 1, more particularly in a recess 18 in this wall closed by a removable cover 19, is that the filter pump is easily accessible from within the pool.

Figure 3:
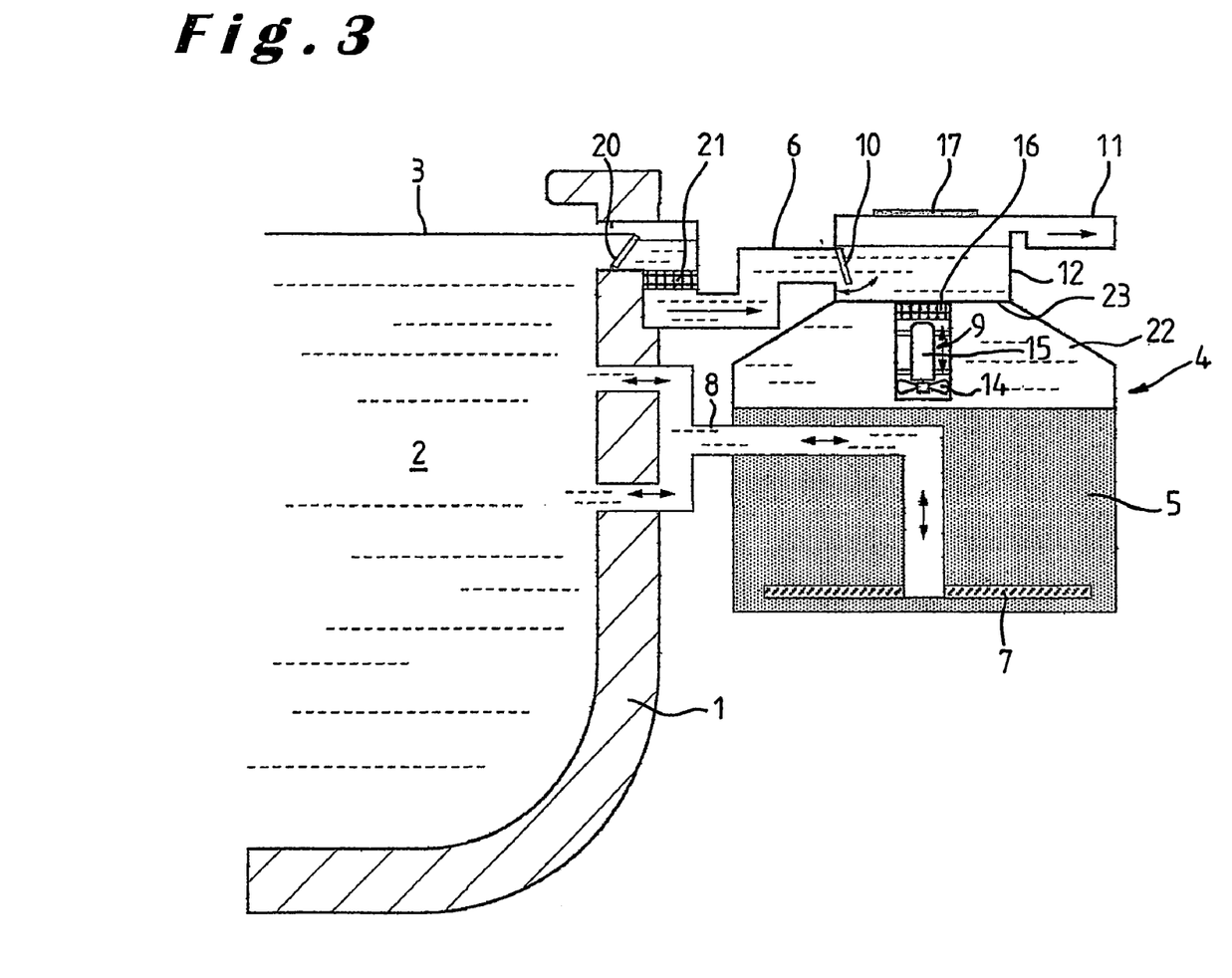

In the embodiment illustrated in FIG. 3, the inlet of the inlet pipe 6 is provided with a conventional skimmer 20 followed by a skimmer basket 21. Since the one-way valve 10 has not to function as a skimmer, the portion of the inlet pipe between the pool and this valve can now be located at a level entirely below the water level of the pool. The one-way valve is now further rotated on the top instead of on the bottom. The advantage of this type of one-way flow valve is that it can be installed below the water level so that the inlet pipe can be connected to the filter vessel below the water level in the pool.

The pump is installed before or upstream the filter bed 5 and pumps water within a closed cavity 22 provided within the filter vessel 4 on top of the filter bed 5. Due to the fact that the upper portion of the filter vessel, namely the portion of the filter vessel to which the drain pipe 11 is connected, is separated by a partition wall 23 from this closed cavity 22, the water level in the filter vessel has not to be controlled since, in the filtering state, the water in the upper portion of the filter vessel cannot rise above the water level in the pool. The advantage of positioning the filter pump upstream the filter bed 5 is that it is easily accessible by removing the cover 19 of the filter vessel 4.

Upstream the pump, a basket 16 is again provided to protect the pump from debris. The return pipe 8 is finally split up into several return lines to have a better distribution of the filtered water throughout the swimming pool.

Figure 4:
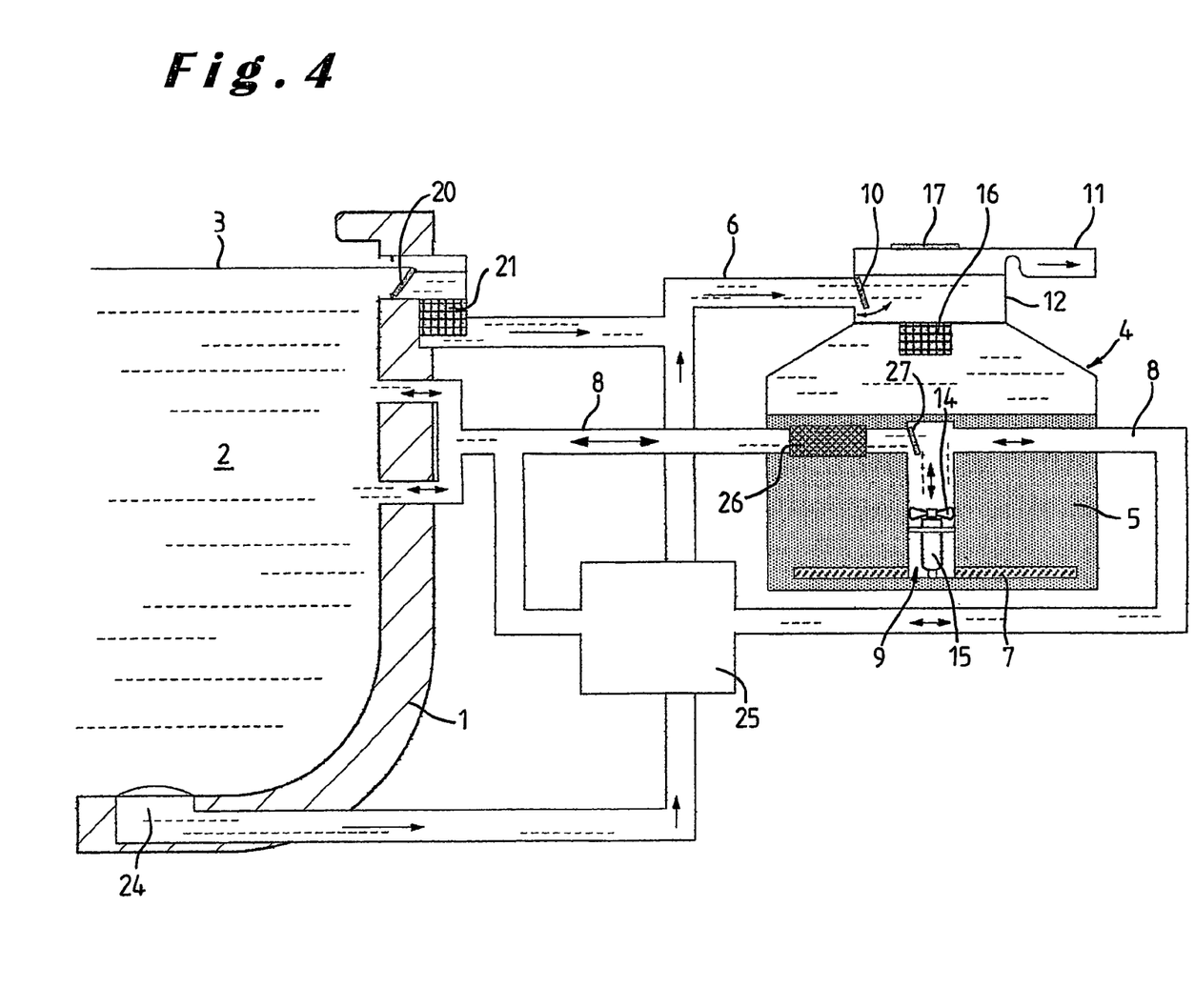

In the embodiment illustrated in FIG. 4 the inlet pipe 6 splits into different pipes leading to skimmers 20 and bottom suction openings 24. Instead of connecting one inlet pipe 6 to the upper portion of the filter vessel, separate inlet pipes could be connected directly to the filter vessel, each inlet pipe being provided with a one-way valve 10 for enabling the back washing of the filter bed 5.

The filter pump 9 is installed downstream the filter bed 5. The return pipe 8 is split up in two pipes to feed an extra external device 25 (such as a heater, etc.) which does not need or cannot handle the full water flow. In the other return pipe an internal device 26 (such as a desinfection device, etc.) is installed. To give more flow to the bypass to the external device 25, a flow regulating valve 27 is installed in the return line to the internal device 26. This flow valve is of the same design as the flow valve 10 used at the entrance of the filter vessel 4, except that is has an opening in it, so water always can flow through and the flow is partially restricted in one way, and not restricted in the other direction. So backwashing is not affected by any pressure loss in the external devices and the extra pipes.

Figure 5:
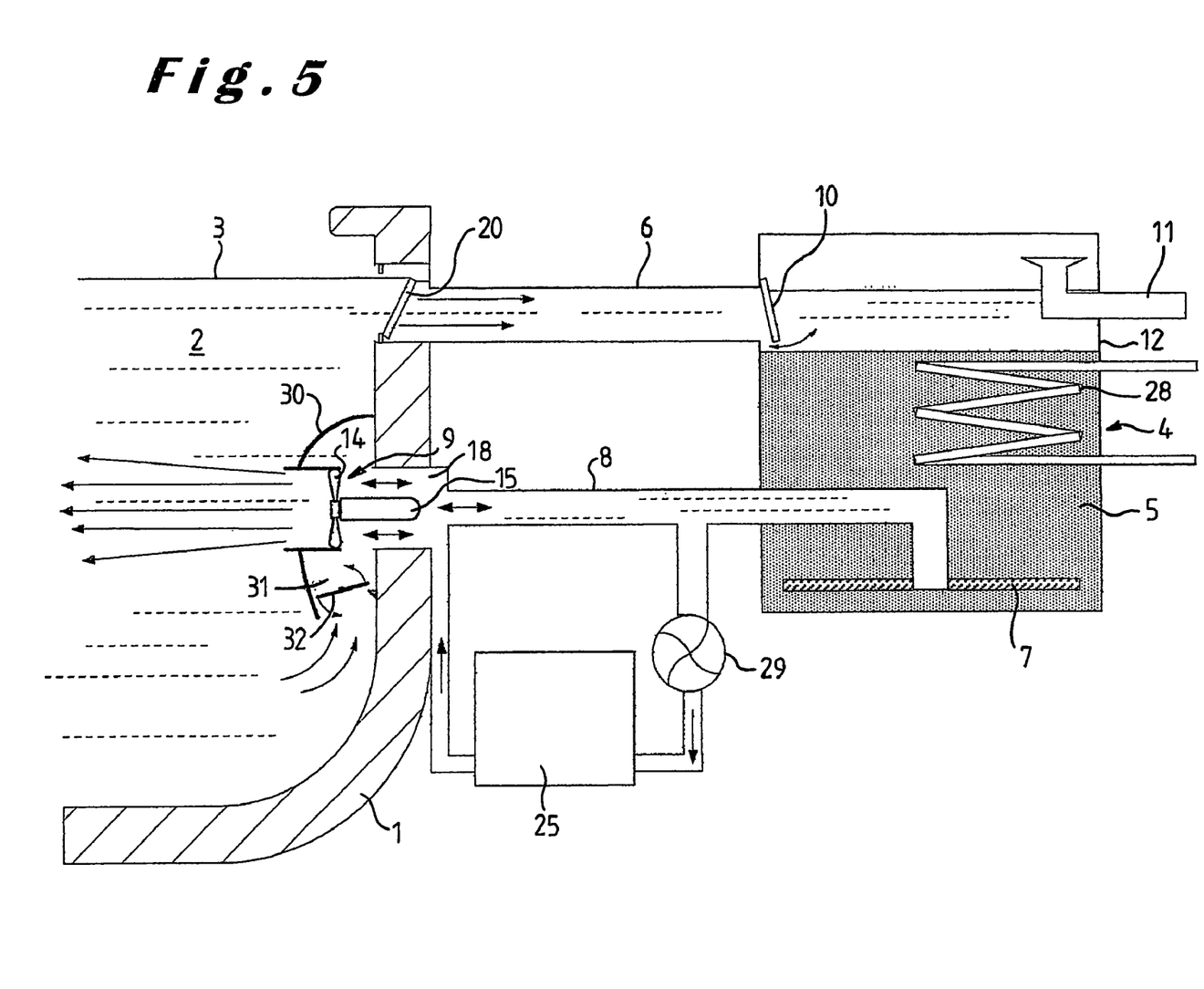

The filtration installation illustrated in FIG. 5 is equipped with a build in heat exchanger 28, which consists of a coil through which the warm water of the heater flows, exchanging the heat to the pool water. The coil is here placed in the filter medium 5.

The bypass to the external device 25 is equipped with an extra pump 29 for extra performance.

The filter pump 9 is situated at the outlet of the return pipe 8, the propeller 14 of the pump 9 being more particularly situated within a space enclosed by an enclosure 30 in the pool whilst the motor 15 is partially located within a recess 18 in the pool wall 1. In the enclosure 30 a by-pass 31 is provided for supplying additional water directly from the pool to the propeller 14 of the pump 9. Due to this additional supply of water, the propeller pump 9 can create a water current in the pool against which a swimmer can swim-in-place. The by-pass 31 is provided with a shut-off valve 32, which can be closed to draw the water only through the filtration installation. This is the filter mode wherein the filter works as described with reference to FIG. 2. When the shut-off valve 32 is opened, the pump can be set at maximum capacity sucking a large amount of water directly from the pool. This is the jet stream mode wherein the filter is by-passed to give unrestricted flow.

In the illustrated embodiment, the by-pass is located along the pool wall 1. In a variant embodiment, the entire pump could be situated within the recess in the pool wall and additional by-pass pipes could be provided to supply additional water to the pump. It is in particular also possible to provide an additional duct between the inlet pipe or pipes and the return pipe In this additional duct a valve can be provided which is normally closed but which opens by the suction force of the pump when the power thereof is increased.

This combination of filter and jet stream is very interesting, since both functions can be obtained at a substantially lower cost then with the devices installed separately.

FIGS. 6 to 9 illustrate further embodiments of the filtration installation according to the invention which offer the important advantage that a vacuum cleaning unit can be connected to the filtration installation. In all of these embodiments, an additional vessel 37 is interposed in the inlet pipe for allowing to connect a vacuum cleaning unit. The additional vessel 37 is in liquid communication with both the pool and the filter vessel so that water from the pool can still flow by gravity into the filter vessel.

Figure 6:
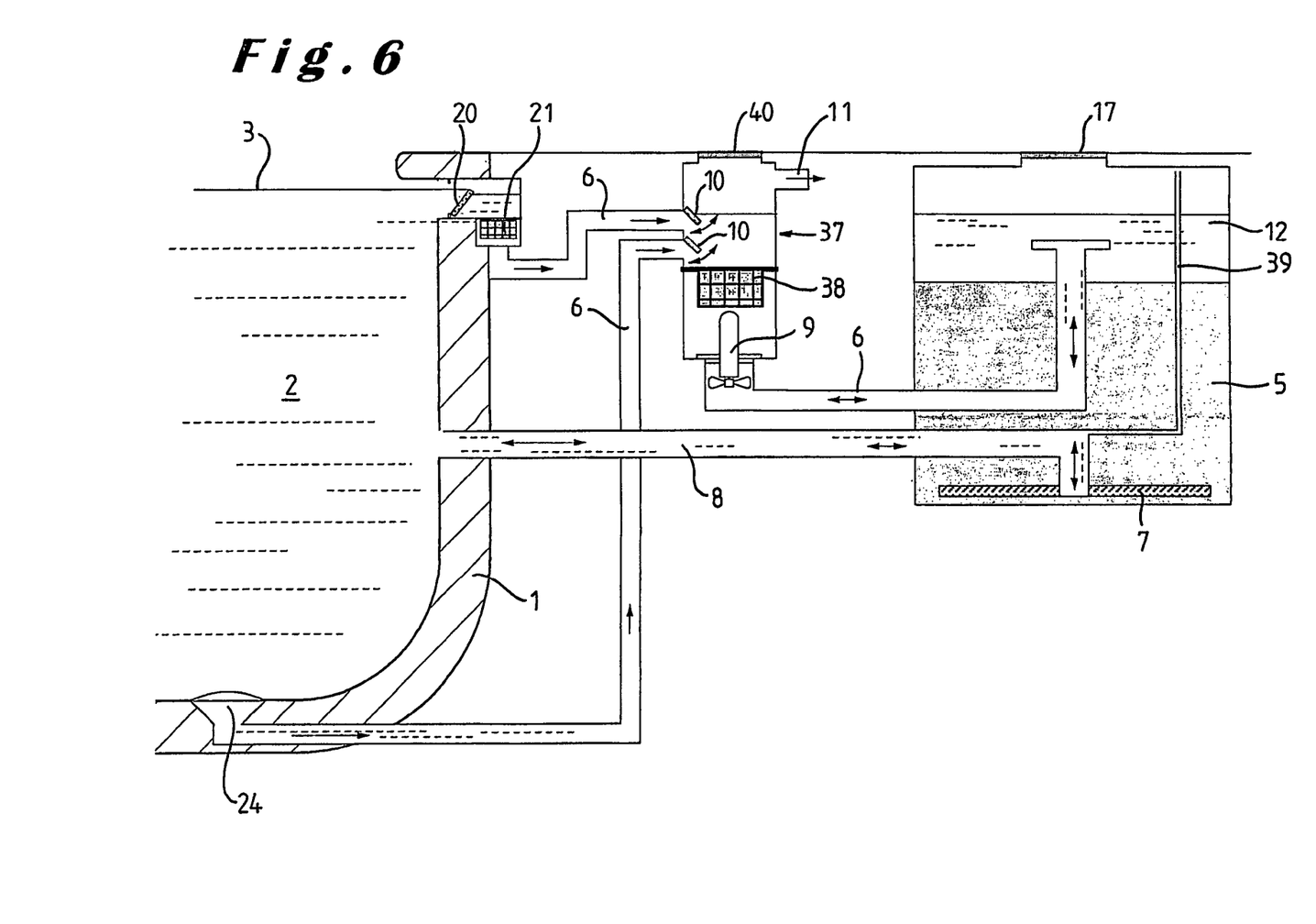

In FIG. 6, the additional vessel 37 is divided in two sections by a basket 38. The upper portion of the additional vessel 37 is connected by two pipes 6 to the pool. Each of the pipes 6 is provided with a one-way valve 10. The upper portion of the additional vessel 37 has further a connection to the drain pipe 11 above the normal waterlevel of the pool. The reversible pump 9 is located downstream the basket 38, i.e. either in the lower portion of the additional vessel or in the portion of the inlet pipe connection the additional vessel 37 with the filter vessel, and pumps the water to the filter vessel.

The filter vessel 4 is a hermetically closed vessel with the filter bed 5 situated under the normal waterlevel 3 of the pool 2. Because it is a closed vessel, a system to evacuate the air in the upper part of the vessel 4 is necessary. In the embodiment of FIG. 6 this system comprises a small tube 39 connecting the upper part of the filter vessel 4 with the return pipe 8 going to the pool 2 so the air entrapped in the upper portion of the filter vessel can escape out of the vessel without having to go through the filter bed 5. The small tube 39 is dimensioned in such a manner that only a small amount of water can flow therethrough, which amount is much smaller than the flow of water generated by the pump either in the filtering or in the backwashing state.

Filtering and backwashing are obtained by reversing the flow of the pump. In FIG. 6 backwashing then occurs due to the difference in pressure between the waterlevel in the pool and the top of the pipe in the filtervessel towards the pump.

Figure 7:
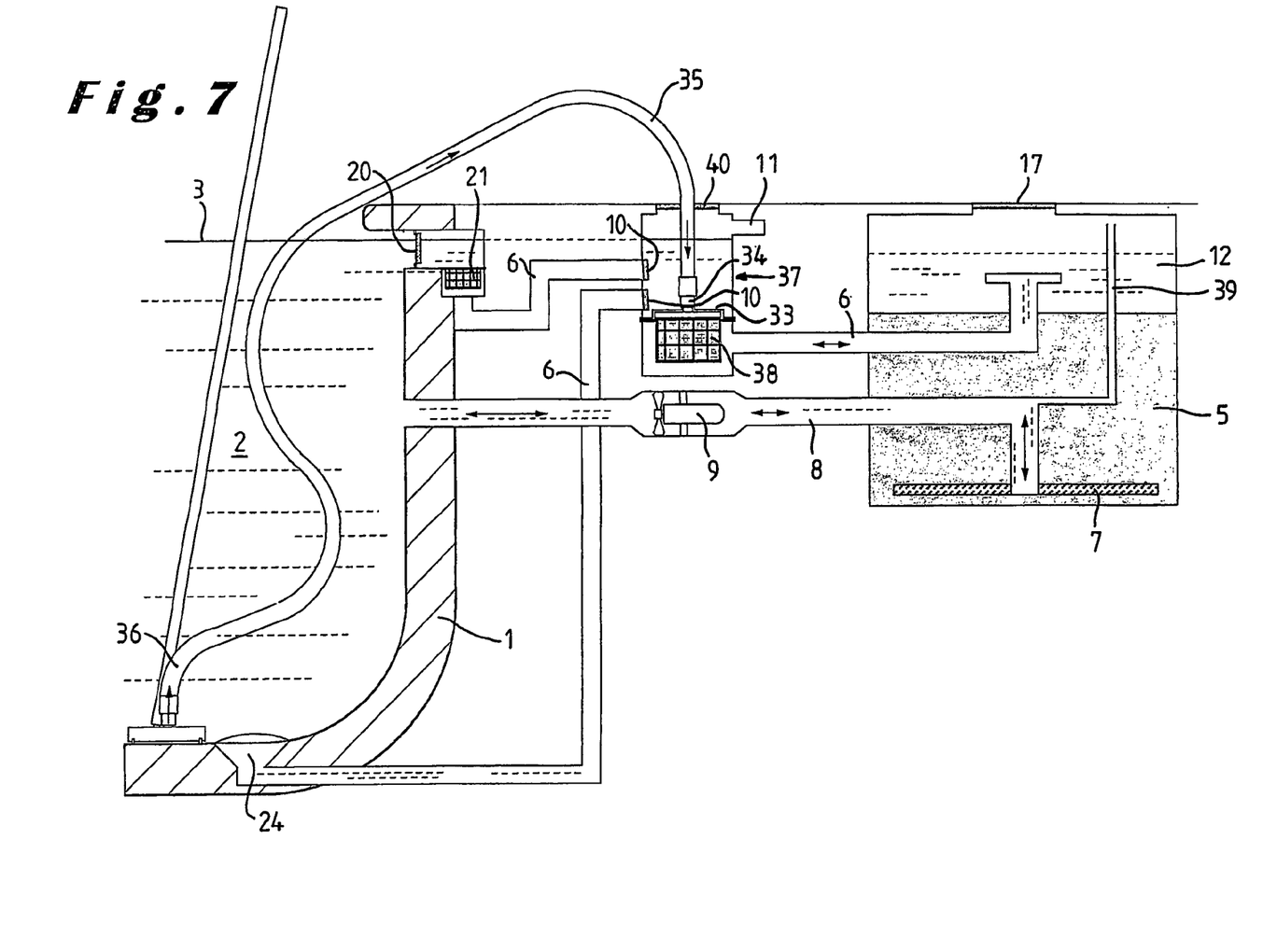

FIG. 7 shows an embodiment which differs only from the embodiment of FIG. 6 by the fact that the reversible pump 9 is arranged in the return 8 instead of in the inlet pipe 6. FIG. 7 moreover illustrates how a vacuum cleaning unit 36 can be connected to the filtration installation. The additional vessel 37 is more particularly provided with a removable cover 40 through which the shut-off element 33 with the fitting 34 can be applied over the basket 38. Due to the fact that the filtration installation is hermetically closed between the shut-off element 36 and the reversible pump, a reduced pressure can be generated behind the shut-off element and therefore in the vacuum cleaning unit connected thereto.

Figure 8:
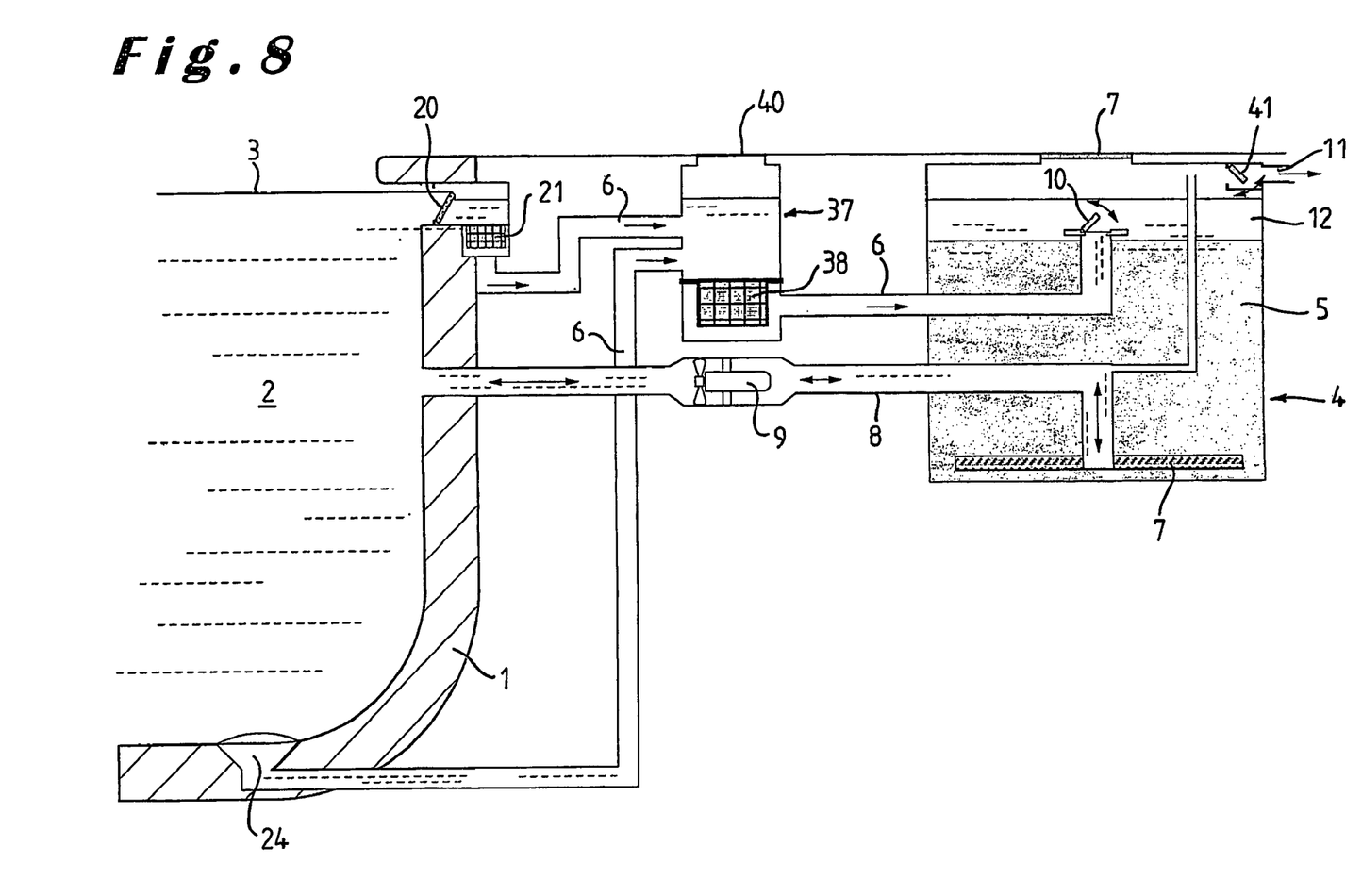
Figure 9:
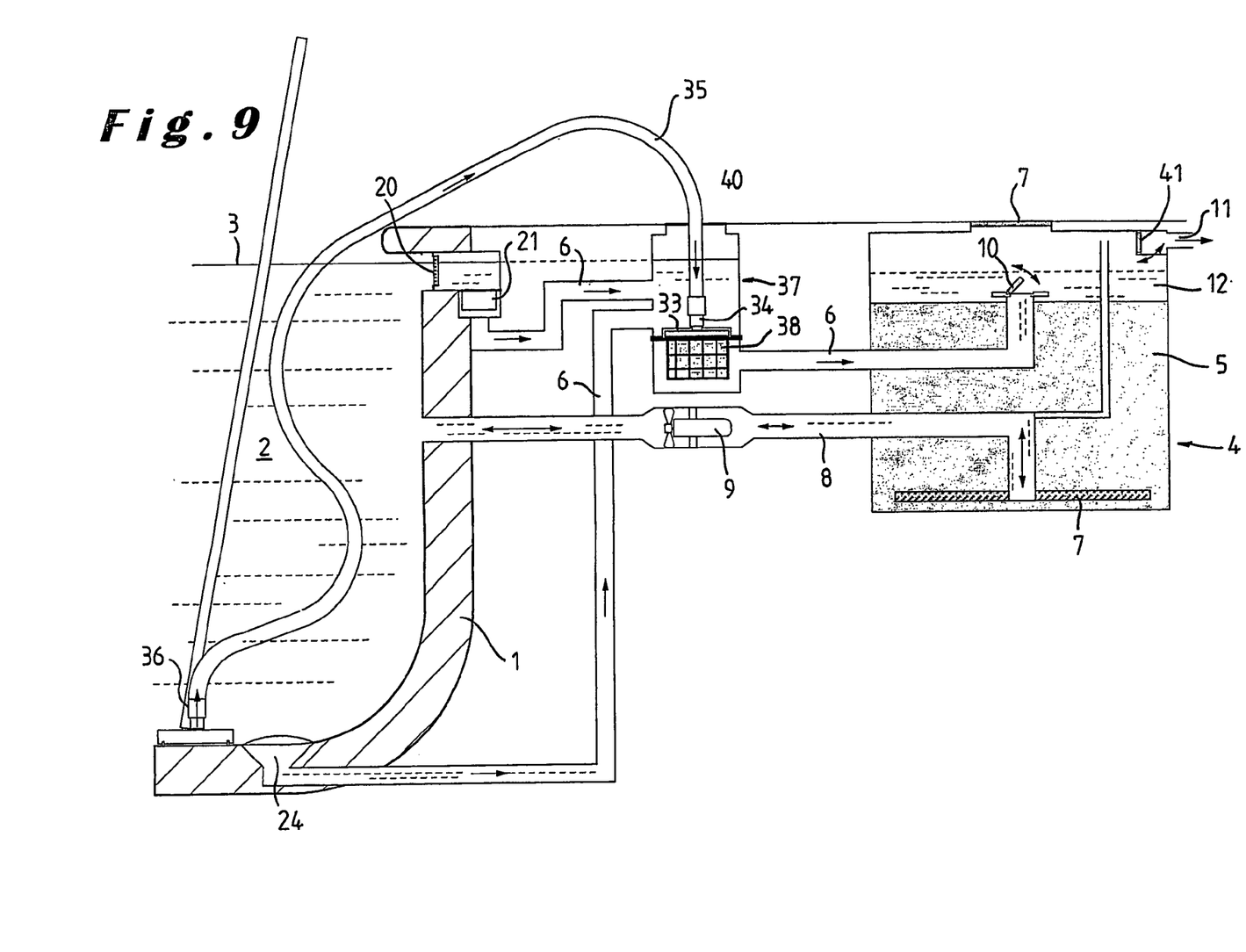

The embodiment illustrated in FIGS. 8 and 9 differs from the previous embodiment in that the portion of the inlet pipe between the additional vessel 37 and the filter vessel 4 is now provided with the one-way valve 10. Moreover, the drain pipe 11 is now located again in the upper portion of the filter vessel 4.

As illustrated in FIG. 9, the vacuum cleaning unit can still be connected to the shut-off element 33 applied on top of the basket 38. Since the drain pipe 11 is now situated between the shut-off element 33 and the pump 9, the drain pipe has been provided with a one-way valve 41 enabling the pump, in its filtering state, to create a reduced pressure behind the shut-off element 33 (see FIG. 9) whilst still enabling the drain pipe to remove water in the backwashing state of the pump.

The filtration installations according to the invention, and in particular the installations illustrated in the drawings offer an number of important advantages.

The filtration installation has a lower installation cost because it can be assembled mostly in the factory and also the filter installation is installed near the pool, so only few pipework has to be done at the construction site. This allows for a much quicker installation which saves on installation time.

Since the filter vessel does not have to support a great pressure, it can be constructed cheaper. Also the price-increase for bigger filters is smaller then for conventional pressure-type vessels. So it becomes cheaper to have a bigger filter which will improve the quality of the water and diminish the maintenance and chemical demand of the pool.

The filter has fewer possible defects due to the simplicity of its design. A lot less valves and pipes, no valves to manipulate, no motorised or pneumatic valves, no more self priming needed. The pump can be installed after the filter medium, so it is impossible for dirt to clog up the pump. It can also be water tested in the factory as a complete system. There is no risk of leaks inside the house since there are no more pipes running into the house or basement or garden storage. So all this guarantees a longer life of the equipment and less cost of maintenance.

The filtration installation also has a lower energy demand because not only the filter is installed closer to the pool, but the hydraulic design of the filter is more efficient. This filter installation will save up to 70% of the energy demand for the same filtering done.

Thanks to the low pressure loss in the filtration installation, it is possible to use propeller type underwater pumps, which are highly efficient in pumping large quantities of water but only have a limited performance in total head. These submersible propeller-pumps make no noise at all, which is a substantial advantage when used in residential applications (such as swimming pools) and a reverse flow is obtained by simply reversing the direction of the rotation of the propeller. Excellent backwashing results due to the high flow rates of the propeller-pump.

The filtration installation is installed underground close to the pool, so there is no more valuable space inside or outside taken, which again allows savings in preparation, building and other costs. Also there are no unsightly pumps or filters which have to be covered or hidden from view or insulated from the noise.

The filtration installation has a lower installation cost, has a lower energy demand and is sturdy and has fewer possible defects due to the simplicity of the design.

The invention claimed is:

1. A filtration installation for filtering water of a water pool (2), in particular of a swimming pool, arranged to be filled with water up to a predetermined water level (3), which installation comprises a filter vessel (4) separate from the water pool (2) and containing a filter bed (5), the filter vessel (4) being arranged to be installed next to the pool (2) with its filter bed (5) situated at least partially underneath said predetermined water level (3), with at least one inlet pipe (6) extending between the pool (2) and an upper portion (12) of the filter vessel (4) for conducting water from the pool (2) to the filter vessel (4) and with at least one return pipe (8) extending between a lower portion of the filter vessel (4) and the pool (2) for conducting filtered water having passed through the filter bed (5) to the pool (2), the installation further comprising a reversible pump (9) enabling to generate, in a backwashing state, an upward flow of water through the filter bed (5), and at least one drain pipe (11) arranged for removing the water pumped by the pump (9) in its backwashing state through the filter bed (5) into the upper portion (12) of the filter vessel (4), characterised in that the upper portion (12) of the filter vessel (4) is in liquid communication through said inlet pipe (6) with the water in the pool (2) so that water from the pool (2) can flow by gravity through the inlet pipe (6) into the filter vessel (4), the inlet pipe (6) is provided with a one-way valve (10) arranged to prevent a flow of water from the upper portion (12) of the filter vessel (4) into the pool (2), the drain pipe (11) is arranged upstream the filter bed (5) but downstream the one-way valve (10), and said reversible pump (9) is disposed downstream the drain pipe (11) so that the water pumped upwards through the filter bed (5) in the backwashing state of the pump (9) is removed through the drain pipe (11) whilst in the reversed filtering state of the pump (9), water is pumped out of the pool (2) to generate a flow of water from the pool (2) through the inlet pipe (6), the filter bed (5) and the return pipe (8) back to the pool (2).

2. An installation according to claim 1, characterised in that the drain pipe (8) is connected to the upper portion (12) of the filter vessel (4).

3. An installation according to claim 2, characterised in that the drain pipe (8) is connected to the upper portion (12) of the filter vessel (4) through the intermediary of the inlet pipe (6).

4. An installation according to claim 1, characterised in that it comprises a removable shut-off element (33) provided with a fitting (34) for connecting a suction tube (35) for a vacuum cleaning unit (36), the shut-off element (33) being arranged to stop, upstream the reversible pump (9), in the filtering state of the pump, at least partially said flow of water from the pool (2) through the inlet pipe (6) to enable to create a reduced pressure downstream the shut-off element (33), the shut-off element being arranged to be applied either upstream or downstream the drain pipe (11), when the shut-off element (33) is arranged to stop the flow of water upstream the drain pipe (11), the drain pipe is provided with a further one-way valve (41) to enable to create said reduced pressure downstream the shut-off element (33).

5. An installation according to claim 4, characterised in that between said shut-off element (33) and the reversible pump (9), the installation is arranged to be closed substantially hermetically.

6. An installation according to claim 1, characterised in that the drain pipe (11) is located at a level such as to provide an overflow for the pool (2) draining in particular water from the pool when the water level in the pool rises above said predetermined water level (3).

7. An installation according to claim 1, characterised in that said reversible pump (9) is a submergible pump.

8. An installation according to claim 1, characterised in that said reversible pump (9) comprises a propeller (14) or an archimedes' screw for generating the flow of water through the filter bed (5).

9. An installation according to claim 1, characterised in that said reversible pump (9) is disposed upstream the filter bed (5), the installation being arranged to be closed substantially hermetically between the reversible pump (9) and the filter bed (5) so that the water in the filter bed (5) can be pressurised by means of the pump when working in its filtering state.

10. An installation according to claim 1, characterised in that said reversible pump (9) is disposed downstream the filter bed (5).

11. An installation according to claim 10, characterised in that said reversible pump (9) comprises a propeller (14) situated at the outlet of the return pipe (8) for generating the flow of water, a by-pass (31) being provided for supplying additional water directly from the pool (2) to the pump (9) to be able to create a current in the pool (2) against which a swimmer can swim-in-place in the pool.

12. An installation according to claim 11, characterised in that the by-pass (31) is provided with a shut-off valve (32).

13. An installation according to claim 11, characterised in that said reversible pump (9) is a submergible pump having in addition to said propeller (14) a pump motor (15) which is also submerged in the water and which is in particular at least partially situated within a recess (18) in the wall (1) of the pool (2) forming the outlet of said return pipe (8) in the pool.

14. An installation according to claim 13, characterised in that the propeller (14) of the submergible pump (9) projects outside a wall (1) of the pool (2) into the pool, the by-pass (31) of water to the propeller (14) being located along this wall (1) of the pool.

15. An installation according to claim 1, characterised in that the portion of said inlet pipe (6) between the pool (2) and the one-way valve (10) has a top surface situated over the entire length of this portion of the inlet pipe above said predetermined water level (3) of the pool (2) so that when connected to the pool filled with water, the water in this portion of the inlet pipe (6) is over the entire length of this portion at said predetermined water level (3) and said one-way valve (10) comprises an upright flap hinging about a hinge (13) fixed to its bottom edge to form a skimmer weir.

16. An installation according to claim 1, characterised in that the top of the filter bed (5) is located below the predetermined water level (3) of the pool (2).

17. An installation according to claim 1, characterised in that filter vessel (4) is connected by said inlet pipe (6) to at least one inlet situated at said predetermined water level (3) and to at least one bottom inlet (24) situated in the bottom of the pool (2).

* * * * *